United States Patent [19]

Becker

[11] 3,951,536
[45] Apr. 20, 1976

[54] FILM PROJECTION SYSTEM
[75] Inventor: Charles J. Becker, San Jose, Calif.
[73] Assignee: American Videonetics Corporation, Sunnyvale, Calif.
[22] Filed: Oct. 25, 1974
[21] Appl. No.: 517,919

[52] U.S. Cl. ............................... 353/76; 353/26 R; 353/101; 352/78 R
[51] Int. Cl.² .................... G03B 3/00; G03B 21/10; G03B 21/11
[58] Field of Search .................. 353/26, 74, 76, 77, 353/78, 101; 352/72, 78, 128

[56] References Cited
UNITED STATES PATENTS
3,271,096  9/1966  Blackmore .......................... 353/75
3,715,155  2/1973  Grupp .................................. 353/78

Primary Examiner—Richard E. Aegerter
Assistant Examiner—A. Jason Mirabito
Attorney, Agent, or Firm—Flehr, Hohbach, Test, Albritton & Herbert

[57] ABSTRACT

A film projection viewing system employs a projector to receive cartridges loaded into the projector in a manner completing a light path through the projector to a viewing screen. A film projector and cartridge having a substantially self-contained film transport therein cooperates to provide a system having a lens system with a focal length setable to a predetermined position in response to insertion of a cartridge into the projector.

6 Claims, 12 Drawing Figures

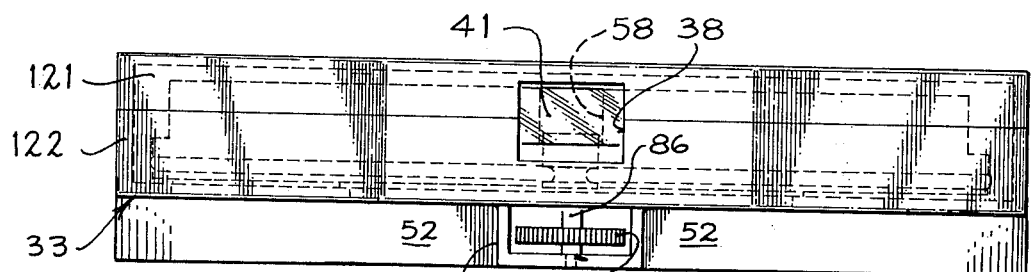
FIG_2
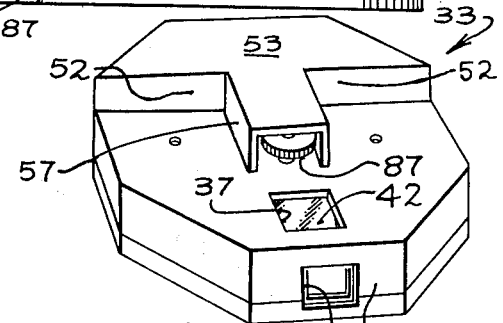
FIG_12
FIG_1
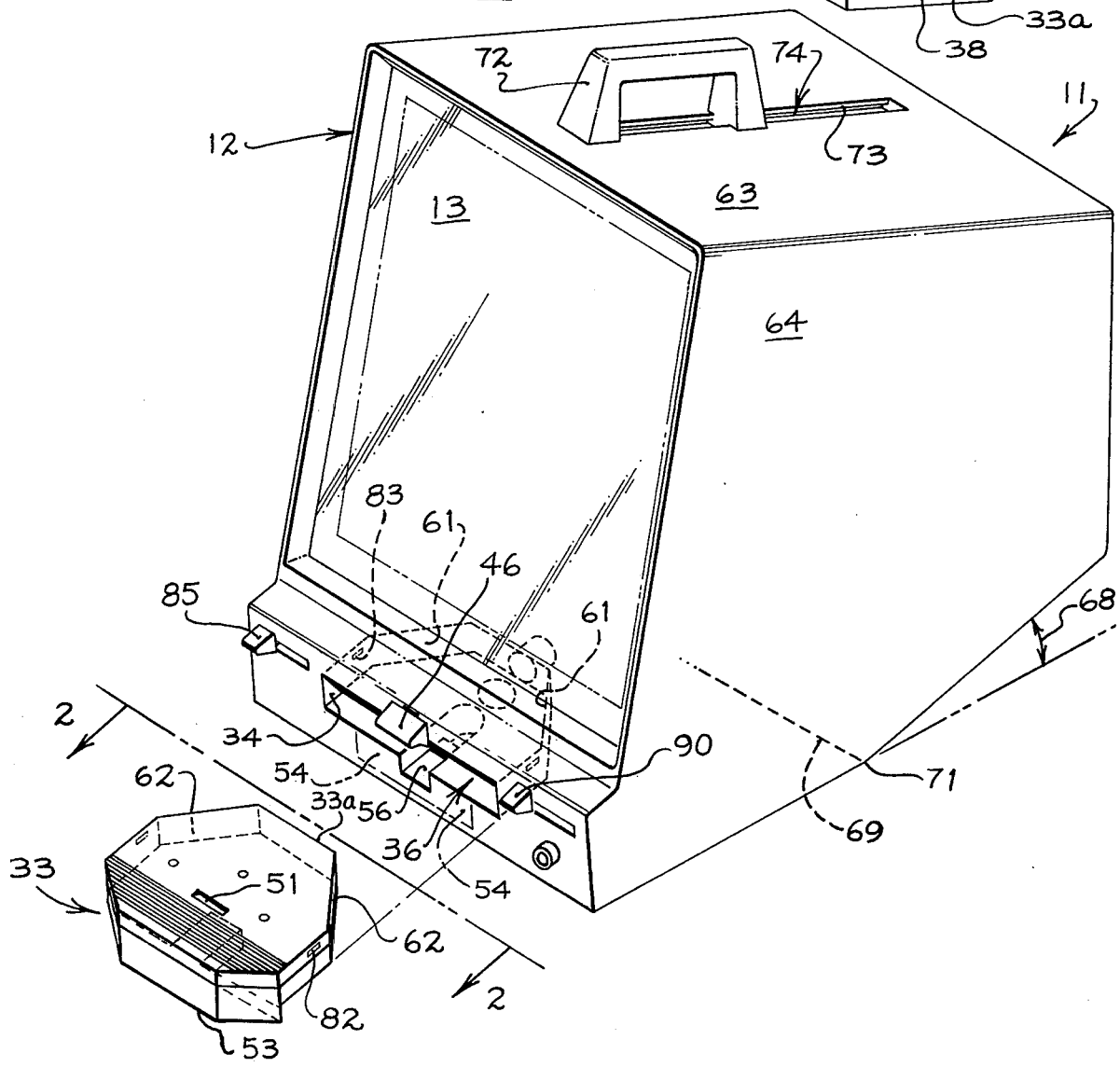

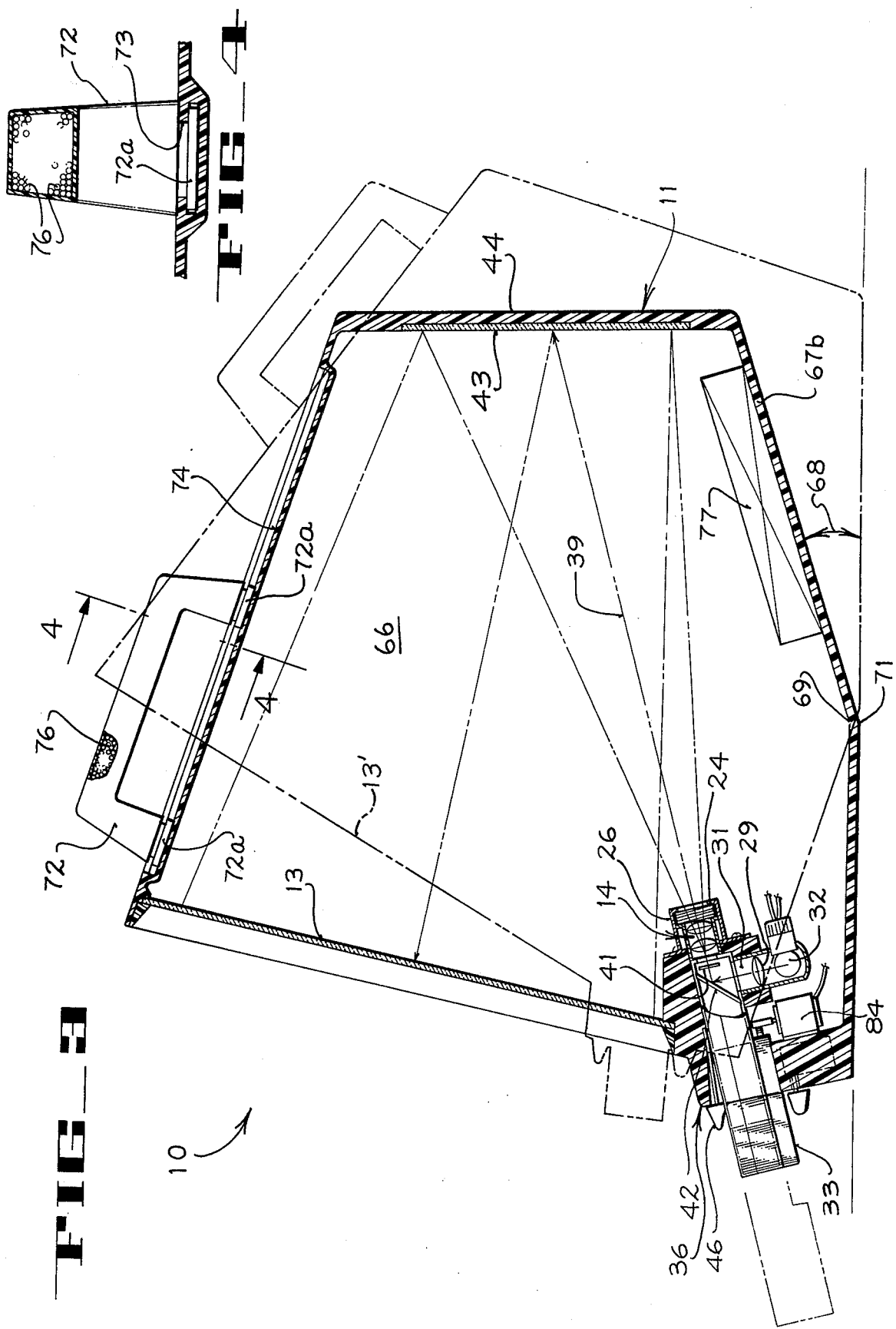

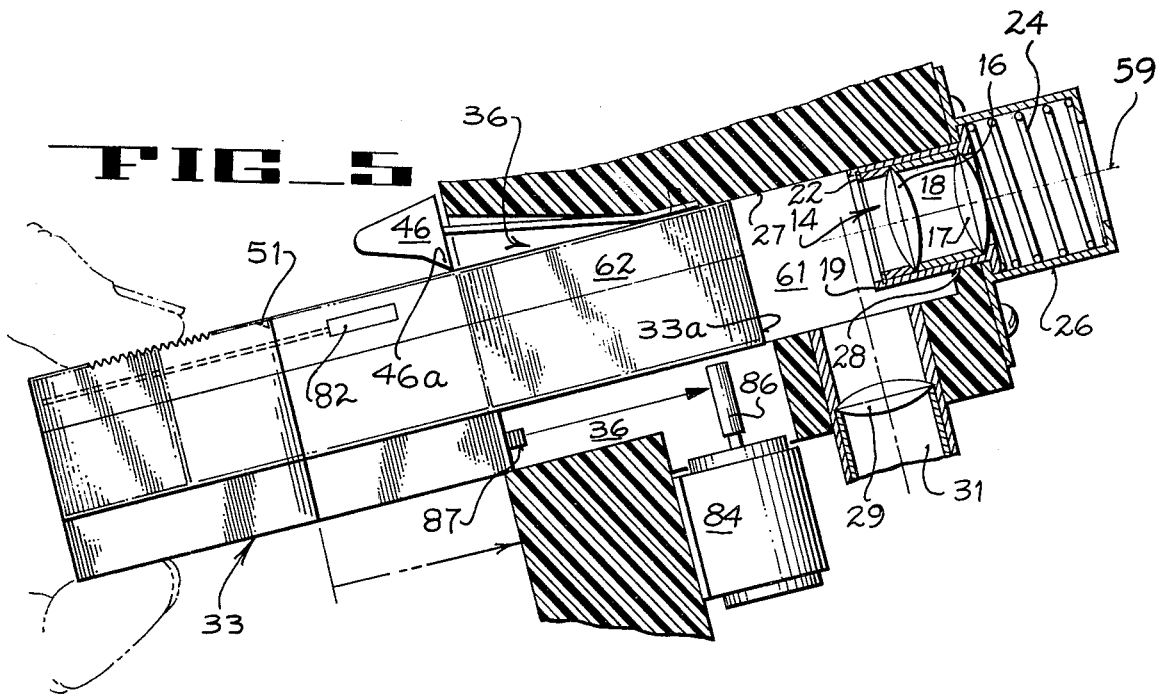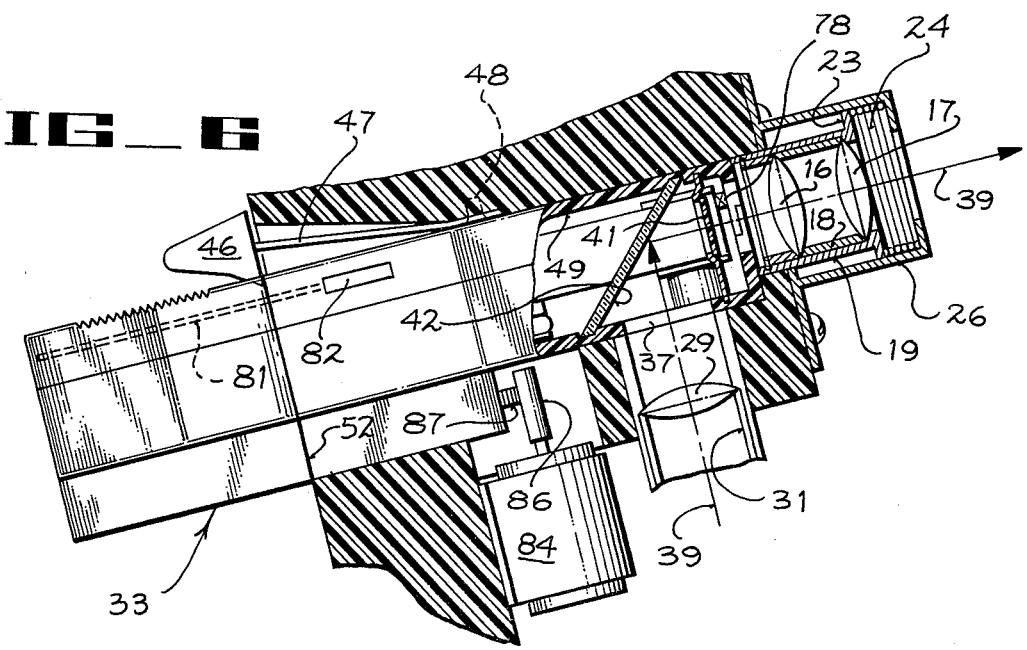

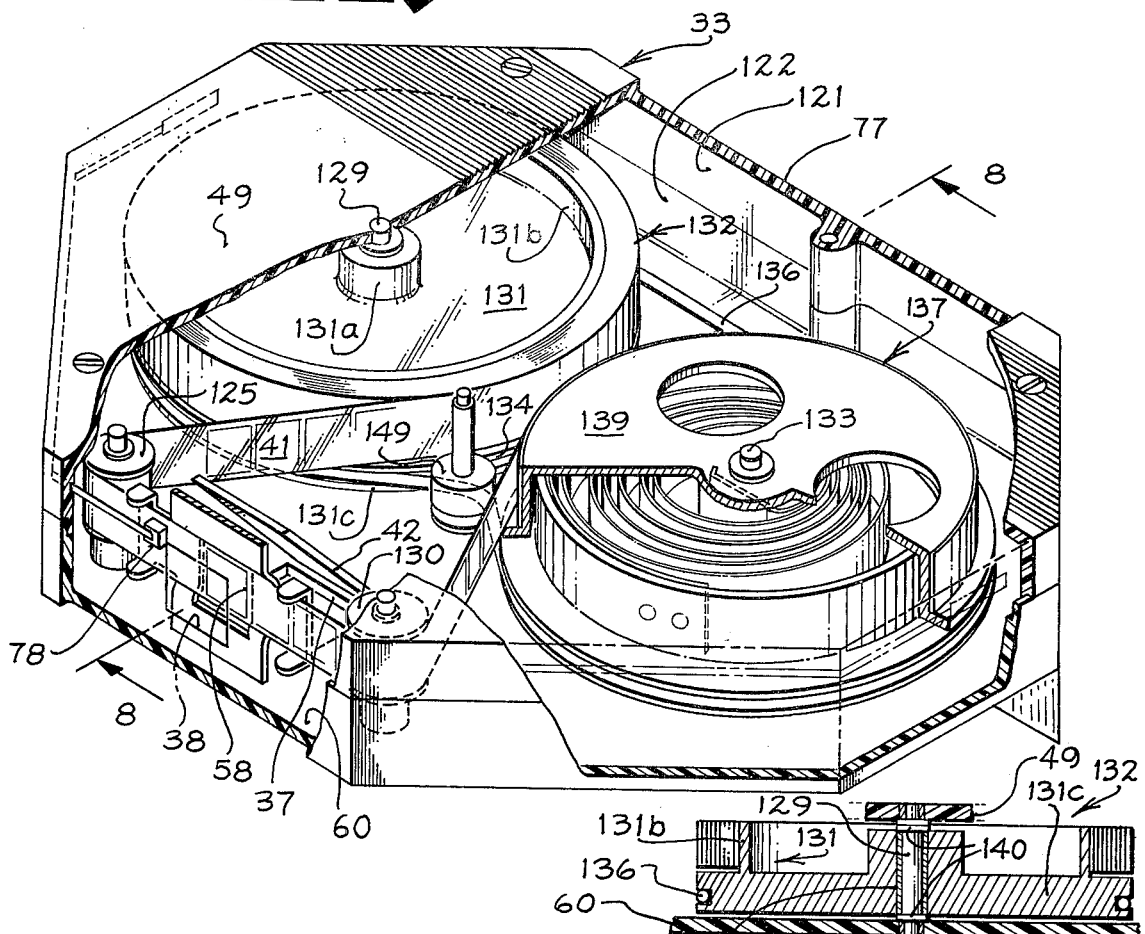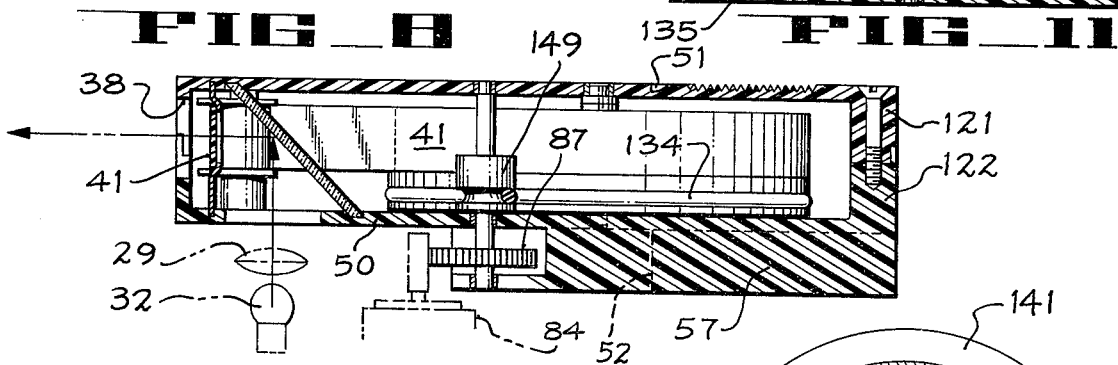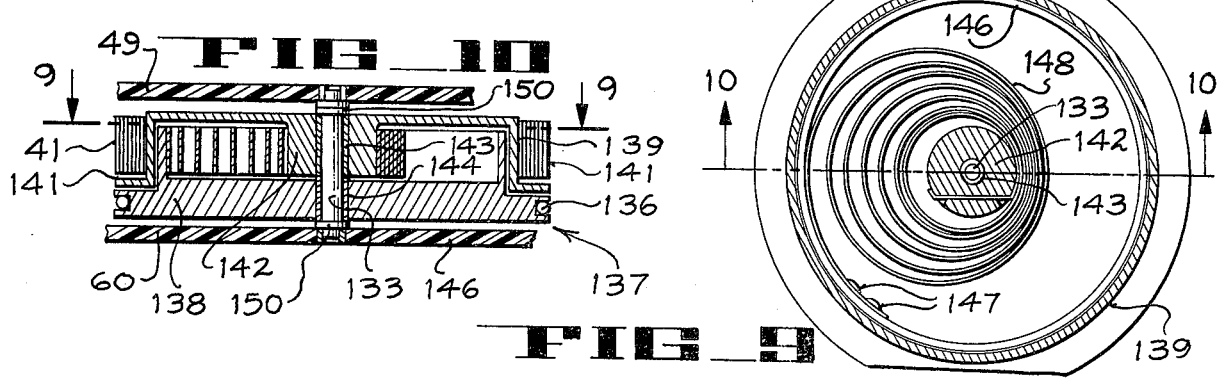

FILM PROJECTION SYSTEM

BACKGROUND OF THE INVENTION

This invention pertains to a film projection system using cartridges of film to be loaded into a projector having a viewing screen for display of images of the film from the cartridges therein. This invention particularly pertains to such a system in which the insertion of the cartridge into the system serves to establish a predetermined focal length in the lens system of the projector to provide repeatable accurate automatic focusing among a number of such cartridges used with a single projector or when using one cartridge with a number of such projectors.

Heretofore, film projection viewing systems, such as microfilm reader systems, have employed projectors into which cartridges of film could be disposed but, upon insertion of each cartridge into the projector, followon focusing of the projector can be expected to be required from one cartridge to the next. In addition, it has been the rule that the projector should contain the microfilm transport apparatus, such as means for tensioning the film as it arrives at a point for projection, so as to leave the cartridge in a relatively simple state of construction involving the barest of elements therein.

It has been observed that there are substantial advantages to be obtained by providing the herein disclosed system as will be pointed out further below.

SUMMARY OF THE INVENTION AND OBJECTS

In general, a film projection system has been provided including a projector having a relatively large hollow housing, an optical viewing screen for receiving images projected onto the screen from a film, and a lens system within the housing movable between advanced and retracted positions along its own axis. A light source within the housing is disposed and adapted to project light along a path defined through the film and the lens system so as to display an image onto the viewing screen of the projector. Means carried by the housing and adapted to receive a film cartridge loaded partially into the housing serves to dispose film of the cartridge into the foregoing named light path. The lens system is disposed so as to be moved in response to insertion of the cartridge thereby focusing the projection system. Finally, means are provided for engaging the cartridge so as to limit the degree of insertion thereof to dispose the lens system at a predetermined position providing a predetermined focal length at which the film will be projected accurately in focus. The cartridge includes an outer surface portion disposed and adapted to engage that portion of the cartridge limiting the degree of insertion of the cartridge whereby engagement of the outer surface portion with a portion of the projection serves to establish the appropriate predetermined focal length of the lens system.

It is a general object of the present invention to provide an improved film projection system.

It is a further object of the invention to provide an improved film projection system characterized by means for establishing a repeatable predetermined focal length within the projector in response to insertion of each cartridge therein to a predetermined degree.

It is another object of the present invention to provide a film projection system in which a portion of the projection light path from a light source to a viewing screen in the projector is defined through the envelope of a cartridge inserted into the projector. It is yet another object of the invention to provide an improved film projection system in which means are provided for laterally adjusting and guiding the film gate of a cartridge into alignment with the axis of a lens system with the projector as the cartridge is inserted.

It is a further object of the invention to provide an improved cartridge for use in conjunction with a projection system whereby the cartridge can form a portion of the light path of the projection system and can include means for pretensioning the film within the cartridge to remove deformations in the film disposed at the film gate of the cartridge.

A further object of the invention is to provide an improved cartridge of the kind described in which a transducer is carried by the cartridge for detecting index marks on the film within the cartridge.

An additional object of the present invention is to provide a film projection system in which the viewing screen can be disposed at one or another of at least two stable states by changing the center of gravity of the projector and cartridge and other contents within the projector, preferably by sliding a weighted handle between advanced and retracted positions so as to transfer the center of gravity of the apparatus from one side to the other of a vertical plane extending upwardly and including a line of intersection defined between portions of the bottom of the apparatus.

The foregoing and other objects of the invention will be more readily evident from the following detailed description of a preferred embodiment when considered in conjunction with the drawings.

BRIEF DESCRIPTION OF THE DRAWINGS

FIG. 1 shows a diagrammatic perspective exploded view of a cartridge and projector system according to the invention;

FIG. 2 shows an elevation view taken along the line 2—2 of FIG. 1;

FIG. 3 shows a side elevation centerline section view of the projection system of FIG. 1 (but with the cartridge unit thereof inserted into the projector unit);

FIG. 4 shows a transverse section view taken along the line 4—4 of FIG. 3;

FIG. 5 shows a side elevation section view of a receiver unit and lens system of the projector unit with the cartridge shown in full line being inserted into the receiver;

FIG. 6 shows a view similar to FIG. 5 with the cartridge fully inserted into the receiver unit with portions of the cartridge broken away for clarity;

FIG. 7 shows a diagrammatic perspective view of a cartridge for use in the system according to the invention with portions broken away for clarity;

FIG. 8 shows a side elevation section view of FIG. 7 taken along the line 8—8 thereof;

FIG. 9 shows a plan view in section of the take-up reel shown in the cartridge of FIG. 7 and taken along the line 9—9 of FIG. 10;

FIG. 10 shows a side elevation section view taken along the line 10—10 of FIG. 9;

FIG. 11 shows a side elevation section view in reduced detail taken along a diameter of the supply roll shown in FIG. 7; and FIG. 12 shows a diagrammatic perspective view of a cartridge inverted so as to disclose the underside thereof.

DETAILED DESCRIPTION OF A PREFERRED EMBODIMENT

A film projection viewing system 10 includes a projector unit 11 including a relatively large hollow housing 12. An optical display viewing screen 13 is disposed at the front of unit 11 for receiving images projected onto the screen from the backside. Accordingly, screen 13 is preferably of a translucent semi-rigid material, such as ground glass or suitable plastic material accomplishing the same or similar function.

Thus, by projecting an image onto the backside of scree.: 13, the image can be viewed from the front side thereof by the operator of the system.

A lens system 14 disposed within housing 12 includes a pair of lenses 16, 17 disposed in fixed spaced relation to each other by suitable means within a sleeve 18 disposed within a generally cylindrical holder 19. An inwardly extending flange or lip 21 is formed to retain sleeve 18 from moving longitudinally outwardly of holder 19 to the right (as shown in FIGS. 5 and 6) while a snap ring 22 retains sleeve 18 within holder 19 from moving longitudinally to the left (as shown in FIGS. 5 and 6).

A radially outwardly extending flange 23 formed about the outer end of holder 19 serves to engage a spring 24 disposed within a bracket 26 whereby the lens system is arranged to be moved between advanced and retracted position against the urging of spring 24. During such movements of the lens system, bracket 26 engages and guides the outer edge of flange 23 while the trailing portion of holder 19 rides upon the annular surfaces 27, 28. A stationary lens 29 directs light upwardly through the light passage 31 from a projection bulb 32 whereby whenever cartridge 33 has been properly loaded into receiver 36 light from bulb 32 will be transmitted against mirror 42 and outwardly via lens system 14 to screen 13.

In general, a film transport cartridge 33 containing a length of film wrapped to form supply and take-up rolls as will be described further below and further including a film transport mechanism for transporting the film from one roll to the other in opposite directions is arranged and designed to conform to the special configuration of receiver opening 34.

Thus, that portion of projector unit 11 formed and adapted to receive cartridge 33 therein shall be referred to hereinafter as the receiver 36 of projector unit 11.

Receiver 36 serves to receive cartridge 33 within opening 34 whereby as cartridge 33 is inserted into receiver 36, the leading end 33a of cartridge 33 serves to engage the inner end (FIGS. 5 and 6) of holder 19 and, upon further insertion into receiver 36, cartridge 33 will move lens system 14 axially to compress spring 24.

Means are provided for limiting the degree to which cartridge 33 can be inserted into receiver 36 whereby lens system 14 will be properly in focus with respect to film 41 within cartridge 33.

Cartridge 33 includes window openings 37, 38 and a mirror 42 disposed and arranged whereby, upon inserting cartridge 33 into receiver 36 to its limited extent, windows 37, 38 and mirror 41 will all line up with the light path 39 originating from projector bulb 32 thereby projecting an image of the film 41 disposed in light path 39 onto the back surface of screen 13 through the folded light path construction now to be described.

Accordingly, referring to FIG. 3, light projected from lens system 14 first strikes a mirror 43 mounted on the inner surface of rear panel 44 of housing 12. The angle of light path 39 and the angle of mirror 43 are disposed whereby the front panel forming viewing screen 13 will receive the light projected therefrom.

Means for holding cartridge 33 in its fully inserted position comprises a readily releasable latch element 46 mounted upon the end of a leaf spring 47 which is, in turn, fixed by the rivet 48 to the interior upper side wall of receiver 36. The upper surface of top wall 49 includes a detent 51 disposed to engage the lower edge 46a of latch element 46 as cartridge 33 advances into receiver 36.

At the time latch element 46 engages detent 51, lens system 14 will be positioned to be closely in focus and, as noted above, windows 37, 38 will be disposed in light path 39 for passing light from projector bulb 32.

Further advance of cartridge 33 into receiver 36 is prevented by the limiting means comprised of the laterally extending portions 52 of the T-shaped body 53 on the under surface of cartridge 33. Portions 52 are disposed for engagement with arresting contact regions 54 defined on the front surface of projector unit 11 flanking the rectangularly shaped groove 56 adapted to accommodate entry of the rectangularly shaped stem portion 57 of the T configured body 53 beneath cartridge 33.

From the foregoing, it will be readily evident that cartridge 33 can be inserted into opening 34 of receiver 36 in only one possible manner, namely, right side up and with the film gate end 33a of cartridge 33 leading into receiver 36.

The foregoing arrangement makes it impossible to misload cartridge 33 into receiver 36. The lateral limiting portions 52 of body 53 engage the arresting regions 54 defined adjacent receiver 36 on the face of housing 12, whereby cartridge 33 cannot be forced too far into receiver 36.

Accordingly, the provision of the guide grooves 56 extending into the cartridge receiving opening 34 guides the entry of body portion 57 carried on and protruding from the under side of cartridge 33 to insure that cartridge 33 will be inserted right side up. In addition, however, further body means such as the cross bar portion of the T-shaped body 53 provides lateral limiting portions 52 protruding away from cartridge 33 for engaging the arresting contact regions 54 so as to limit the degree of insertion of cartridge 33 and thereby establish the correct displacement of lens system 14 so as to place the system in precise focus.

Cartridge 33 includes a gate opening 58 disposed and adapted to be positioned centrally on the axis 59 (FIG. 5) of lens system 14. Accordingly, a pair of converging guide surfaces 61 formed within opening 34 at the interior sides thereof serve to engage convergent side wall portions 62 of cartridge 33 disposed at the leading end thereof so as to laterally position cartridge 33 with respect to the axis 59 of lens system 14.

Means, as now to be described, have been provided for disposing viewing screen 13 of projector unit 11 at one or the other of two stable positions, either as shown in full or phantom lines in FIG. 3, the phantom line position being designated by the reference numeral 13'. Accordingly, housing 12 comprises a large, hollow body having a top panel 63, a front panel or viewing screen 13, a back panel 44, confronting side panels 64, 66, and a bottom panel 67 having first and second portions 67a, 67b respectively laid in two different planes. The plane of panel 67a merges with the plane of panel 67b at a relatively small angle 68 so as to define a line of intersection 69 therebetween forming a fulcrum 71.

Means are carried by housing 12 for readily relocating the center of gravity of projector unit 11 so as to cause projector unit 11 to rest in a first or second stable condition on one or the other of the two bottom panel portions 67a, 67b. This permits the viewing screen 13 to be disposed at one or another of two selected angles.

Accordingly, a carrying handle 72 is arranged to slide along the top panel 63 and is fastened thereto by means of a tongue-and-groove coupling. For example, handle 72 includes tongue portions 72a disposed to engage beneath the overhanging longitudinally extending lips 73 formed in top panel 63.

As thus arranged, handle 72 can be readily moved longitudinally of the slot 74. Handle 72 is formed of a hollow rigid or semi-rigid material such as plastic and contains high density, relatively heavy material therein, such as BB's or bird shot 76, or other suitably heavy material whereby the carrying handle is of sufficient weight and has a sufficiently movable displacement to be able to transfer or displace the center of gravity of housing unit 12 and the contents thereof, (such as the electronic package 77 and cartridge 33 disposed within receiver 36), from one side of a vertical plane extending upwardly through the line of intersection 69.

As now to be described, cartridge 33 includes a film transport apparatus whereby means are provided within envelope 77 or case for pre-tensioning film 41 at gate opening 58 so as to lie taut and free of deformation in the surface of the film thereat. By providing this tensioning of the film, deformations in the film at gate 58 are removed so as to avoid creating aberrations in the projected image from the film.

Transducer means in the form of the light responsive transducer element 78 is carried by envelope 77 and disposed and adapted to register with a portion of film 41 moving within the envelope. Transducer 78 serves to detect indicia of known type and style carried by film 41 for identifying frames of film 41.

In addition, means forming electric leads 81 are coupled to transducer 79 and carried by envelope 77 in position for coupling transducer 79 into and out of a circuit having portions carried within receiver 36. The circuit is schematically represented by and includes the interior contacts 83 disposed upon the interior side walls of opening 34 of receiver 36 for engaging contacts 82 located on both sides of cartridge 33 and coupled to leads 81.

Thus, as cartridge 33 is urged forwardly into operative position within opening 34, contacts 82 will engage contacts 83 which, in turn, form the connection points to known circuitry involving counters and the like for determining the number of index marks counted by transducer 78.

A drive motor 84 arranged with a drive spindle 86 carried on the armature of motor 84 engages a drive wheel 87 of cartridge 33 for transporting film from one roll thereof to the other, all as to be described further below. However, for now, it is pertinent to note that the drive mechanism is contained within housing unit 12 while the film transport apparatus and film tensioning means has been advantageously contained within cartridge 33. Further, when detent 51 has engaged catch 46, spring 24 will be substantially compressed whereby upon release of catch 46, spring 24 will boost cartridge 33 partially out of receiver 36 where it can be readily removed. Knobs 85, 90 schematically represent motor controls of known style for selectively varying the rate and direction of rotation of the armature of motor 84 for correspondingly driving film 41 via wheel 87.

A film transport arrangement as disclosed in FIGS. 7, 8, 9, 10 and 11 is constructed as now to be described.

Cartridge assembly 33 includes a generally hollow envelope 77 comprised of a pair of opposed half sections 121, 122. Section 121 forms the top and includes a transverse top panel 49, while section 122 generally forms the bottom and includes a bottom panel 60.

The bottom of envelope 77 further includes an elongate downwardly depending T-shaped rectilinear body 53 forming a key portion adapted to engage the keyway groove 56 so as to insure proper orientation of cartridge assembly 33 as it is inserted into projector unit 11.

As thus arranged, bottom panel 60 of envelope 77 provides a base member from which rolls of film can be supported for rotation. A mounting spindle 129 extends into both the top and bottom panels 49, 60 to support hub 131.

Hub 131 includes a journal portion 131a with a bearing sleeve 135 located between spindle 129 and portion 131a to permit rotation of hub 131.

The ends of bearing sleeve 135 are spaced by shims 40 to form the confronting surfaces of panels 49, 60.

Hub 131 further includes a peripheral portion 131b of generally cylindrical construction adapted to receive film 41 wrapped thereabout to form the supply roll 132.

The term "supply roll" in the present instance is used simply as a convention for conveniently explaining the function and operation of the apparatus since it will be readily evident that by merely reversing motor 84, the transport becomes bi-directional and can feed film in both directions whereby roll 132 could also be considered a "take-up" roll.

A base or drive body portion 131c of hub 131 extends radially outwardly beyond the convolutions of film 41 wrapped about flange 131b so as to lie beneath film 41 as it is wrapped about hub 131. Thus, means for rotating hub 131 includes a peripheral groove 134 formed into the side edge of drive body 131c.

As will be evident further below, an endless, cyclically moving drive belt 136 lies in groove 134 for rotating hub 131 about the rotatable mounting means defined by spindle 129 and its associated bearing.

A "take-up" roll (used only in the sense that the other roll was referred to as a "supply" roll using the arbitrary convention noted) is mounted for rotation about spindle 133. Spindle 133 extends into and is secured in both the top and bottom plates 49, 60. The take-up roll assembly 137 includes a rotating disc-like drive body 138 also formed with a peripheral groove to receive drive belt 136.

Body 138 includes a sleeve bearing 145 spaced by shims 150 from plate 60 to permit rotation of body 138 about the axis of spindle 133.

A hat-shaped take-up hub element 139 includes film 41 wrapped therearound and a peripheral outer brim portion 141 therebeneath, as well as downwardly depending journal portion 142 disposed for rotation about a sleeve bearing 143.

Thus, drive body 138 and hub 139 rotate about the same axis of rotation independently of each other (except for the spring 148 coupling therebetween). Finally, body 138 includes an axially extending cylindrical portion 146 extending upwardly within hub element 139 and hereafter referred to as the coupling portion of drive body 138.

Accordingly, there has been provided a rotatable drive body and a take-up hub element 139 disposed for independent rotation to wrap film 41 therearound. Another drive body also supports the supply roll for rotation to feed film therefrom to the take-up hub element 139.

Finally, coupling means in the form of portion 146 and the rivets 147 or other suitable attaching device couple one end of spring 148 thereto for movement with the upwardly extending cylindrical rim portion 146 for rotation therewith relative to hub element 139.

Clock spring 148 interconnects between hub element 139 and the coupling portion 146.

In operation, clock spring 148 can be pre-tensioned to tend to rotate take-up hub element 139 in a direction tending to wrap film 41 therearound. Finally, drive means in the form of motor 84 and its associated drive spindle 86 engage the drive gear or wheel 87 for rotating drive pulley 149 to move belt 136. Belt 136 rotates the take-up hub drive body 138 and the outer end of resilient clock spring 148 to wind film 41 about hub element 139 while rotating the supply roll (via the film) for unwinding film therefrom.

It will be readily evident that the path of movement of film 41 proceeds from hub 131 to flanged guide roller 125, past transducer 78, across another flanged idler 130, and then to take-up roll assembly 137.

In operation, the presence of the pre-tensioned clock spring 148 serves to tend to rotate hub element 139 in a wind-up direction whereby the winding tendency of spring 148 serves to maintain tension in that span of film 41 defined between the supply and take-up rolls.

In feeding film from supply roll 132 to takeup hub element 139, spring 148 constitutes a portion of the drive coupling whereby rotation of body 138 rotates the cylindrical portion 146 which, in turn, rotates rivets 147 at one end of spring 148. At the other end of spring 148 journal hub 142 is attached to spring 148 so as to rotate the hatshaped outer hub element 139 in response to the spring rotation.

By pre-tensioning spring 148, a resilient means is provided in the drive train tending to add to the angular rate of rotation of hub element 139 when hub element 139 is receiving film and to substract from the angular rate of rotation of hub element 139 when film 41 is being unwound or fed in the opposite direction from hub element 139 so as to maintain tension in that span of film extending between the two hubs as the film is being fed in either direction.

It has been observed that the restraint imposed by coupling both the supply and take-up rolls together by means of belt 136 and the restraint afforded by drive motor 84 coupled to drive wheel 87 all combine to prevent the pretensioned spring 148 from driving the film under its own power. However, it is to be appreciated that only minimal energy needs to be drawn from motor 84 to drive the supply and take-up rolls.

Thus, the drive means provides sufficient restraint via coupling one end of spring 148 to the drive means to prevent the coupled end of spring 148 from freely unwinding so as to release the energy of the spring.

Further, it should be readily evident that the number of pre-tensioned turns required to be made to spring 148 will be minimal since both rolls are coupled to rotate together and only the difference in turns between the supply and take-up rolls is required to be compensated for by the energy in the spring.

From the foregoing, it will be readily evident that there has been provided an improved film projection system suitable for use with microfilm or other film, and in which a repeatable focal length is established in response to insertion of a film cartridge into a receiver carried by the projector unit. Thus, repeatable focal length performance is accomplished even though the projector must employ many cartridges and, accordingly, no re-focusing is necessary.

Further, from the foregoing, it is evident that the plane of the film at the film gate will lie under tension in order to eliminate deformations in the surface of the film which otherwise might cause aberrations in the projection of the images recorded on the film.

I claim:

1. In a film projection system,
   a. a projector including a relatively large hollow housing,
   b. an optical viewing screen for receiving images projected onto said screen from a film,
   c. a lens system movable between advanced and retracted positions within said housing,
   d. means biasing said lens system to its retracted position,
   e. a light source disposed within said housing and adapted to project light along a path through a film and said lens system to display an image onto said viewing screen,
   f. means carried by said housing and adapted to receive a film cartridge inserted partially into said housing for disposing film of said cartridge into said light path, said lens system being moved to and maintained in said advanced position in response to insertion of said cartridge, and
   g. means serving to engage the cartridge to limit the degree of insertion thereof to dispose said lens system at a predetermined position providing a predetermined focal length with respect to said film.

2. A system according to claim 1 further comprising a film cartridge and a film transport contained therein, said cartridge being formed to include an outer surface portion disposed and adapted to engage the last named said means for limiting the degree to which said cartridge can be inserted into said housing.

3. A system according to claim 1 including a film cartridge, a film transport within the cartridge for transporting and feeding film between supply and take-up rolls thereof, means defining a light path leading into and out of the cartridge via the film, the last named means including windows formed through the walls of said cartridge.

4. A system according to claim 2 comprising an opening formed in said housing to receive said cartridge, a pair of converging guide surfaces formed within said opening at the interior sides thereof, said cartridge having convergent side wall portions disposed at the leading end thereof for engaging said guide surfaces to laterally position said cartridge with respect to said light path and the axis of said lens system.

5. A film projection display system comprising a. a projector including a relatively large hollow housing,
b. an optical viewing screen for receiving images projected onto said screen from a film,
c. a lens system movable between retracted and advanced positions within said housing,
d. means biasing said lens system to its retracted position,
e. a light source disposed within said housing and adapted to be projected along a light path defined through a film and said lens system to project an image onto said screen,
f. an opening formed in said housing for receiving a film cartridge inserted into said opening for disposing film of the cartridge into said light path, said lens system being moved to and maintained in said advanced position in response to insertion of the cartridge,
g. a pair of converging guide surfaces formed within said opening at the interior sides thereof adapted to engage convergent side wall portions of the cartridge disposed at the leading end thereof so as to laterally position a cartridge with respect to said light path.

6. In a film projection display system of a type having a projector including a relatively large hollow housing, an optical viewing screen for receiving images projected onto said screen from a film, the combination comprising:
a. a lens system movable between retracted and advanced positions within said housing,
b. a spring yieldingly urging the lens system to its retracted position,
c. a light source disposed within said housing and adapted to be projected onto said viewing screen along a light path defined through said lens system,
d. means carried by said housing and adapted to receive a film cartridge inserted partially into same for disposing film of said cartridge into said light path, said lens system being moved to and maintained in a predetermined advanced position against the urging of said spring by insertion of said cartridge,
e. catch means for holding said cartridge at said fixed position and serving upon release of said catch to permit said spring to boost said cartridge partly from said receiving means.

* * * * *